United States Patent [19]

Weldy

[11] 3,957,716

[45] May 18, 1976

[54] SIZED CARBON FIBERS

[75] Inventor: Winfred E. Weldy, Wilmington, Del.

[73] Assignee: Hercules Incorporated, Wilmington, Del.

[22] Filed: Mar. 3, 1975

[21] Appl. No.: 554,998

Related U.S. Application Data

[62] Division of Ser. No. 402,493, Oct. 1, 1973, Pat. No. 3,914,504.

[52] U.S. Cl. .................. 260/37 EP; 260/830 TW
[51] Int. Cl.² .......................................... C08L 63/02
[58] Field of Search ................ 260/37 EP; 428/367

[56] References Cited
UNITED STATES PATENTS

| | | | |
|---|---|---|---|
| 3,627,466 | 12/1971 | Steingiser et al. | 260/37 EP X |
| 3,770,539 | 11/1973 | Bullock | 428/367 X |
| 3,837,904 | 9/1974 | Hill | 428/367 X |

*Primary Examiner*—Lewis T. Jacobs
*Attorney, Agent, or Firm*—Michael B. Keehan; Edith A. Rice

[57] ABSTRACT

Carbon fibers are coated with a sizing composition comprising a polyglycidyl ether, cycloaliphatic polyepoxide or their mixtures. Preferred sizes are mixtures of a liquid diglycidyl ether or bisphenol A and a solid diglycidyl ether of bisphenol A.

4 Claims, 1 Drawing Figure

U.S. Patent   May 18, 1976   3,957,716
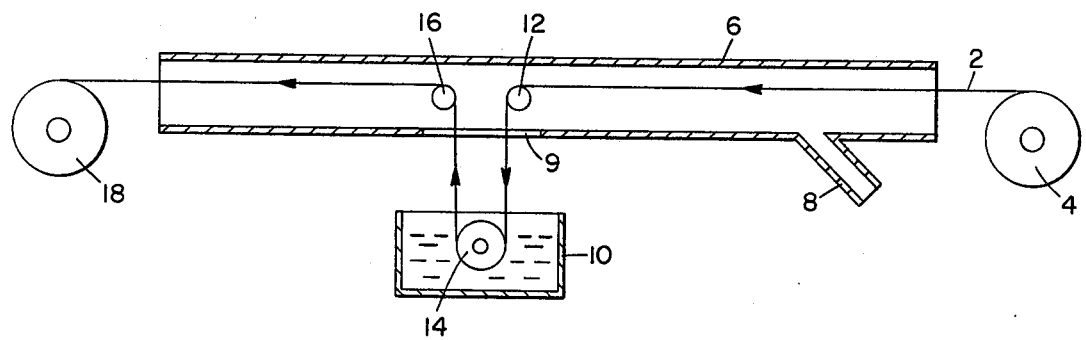

SIZED CARBON FIBERS

This is a division of application Ser. No. 402,493, filed Oct. 1, 1973, now U.S. Pat. No. 3,914,504.

This invention relates to protective sizing compositions for carbon fibers and in particular to protective sizing compositions for carbon fibers based on certain epoxy compounds.

The term carbon fibers is used in this application in its generic sense and includes both graphite fibers and amorphous carbon fibers. Graphite fibers are defined herein as fibers which consist essentially of carbon and have a predominate X-ray diffraction pattern characteristic of graphite. Amorphous carbon fibers, on the other hand, are defined as fibers in which the bulk of the fiber weight can be attributed to carbon and which exhibit an essentially amorphous X-ray diffraction pattern. Carbon fibers can be prepared by known processes from polymeric fibrous materials such as polyacrylonitrile, polyvinyl alcohol, pitch, natural and regenerated cellulose, which processes include the steps of carbonizing or graphitizing the fibers.

Carbon fibers are generally fragile and subject to abrasion during handling. It has now been discovered that sizing compositions based on certain epoxy compounds protect carbon fibers against such damage. When carbon fibers are to be used in preparing composite structures with resin matrix systems, they are frequently subjected to a surface pretreatment to improve the adhesion between the carbon fibers and the resin matrix. The fiber surface is usually oxidized in such a pretreatment, for example by reaction with an oxidizing agent. Alternatively, the carbon fiber can be oxidized by electrolytic treatment using an electrolyte which will generate nascent oxygen at the surface of the carbon fiber during the electrolysis process. The sizing compositions of this invention do not detract from the adhesion improvement of such surface treated fibers.

In accordance with this invention there is provided carbon fibers coated with a sizing composition comprising an epoxy compound, selected from the group consisting of polyglycidyl ethers, cycloaliphatic polyepoxides and mixtures thereof. The sized carbon fibers are compatible with epoxy resin matrix systems used to prepare composite structures. The size can be applied to untreated or surface pretreated carbon fibers to protect them against abrasion resistance.

Polyglycidyl ethers which can be used, in accordance with this invention, as a protective size for carbon fibers include diglycidyl ethers, trigylcidyl ethers, tetraglycidyl ethers and higher polyglycidyl ethers. Mixtures of any of the polyglycidyl ethers can also be used.

Illustrative digiycidyl ethers that can be employed include diglycidyl ether; diglycidyl ether of 1,3-butanediol; 2,6-diglycidyl phenyl glycidyl ether; 1,8-bis(2,3-epoxypropoxy)octane; 1,3-bis(2,3-epoxypropoxy)benzene; 1,4-bis(2,3-epoxypropoxy)benzene; 1,3-bis(4,5-epoxypentoxy)-5-chlorobenzene; 4,4'-bis(2,3-epoxypropoxy)diphenyl ether; 2,2-bis(2,3-epoxypropoxyphenyl)methane; and 2,2-bis[p-(2,3-epoxypropoxy)phenyl] propane, i.e., the diglycidyl ether of bisphenol A.

Illustrative triglycidyl ethers that can be employed include triglycidyl ethers such as the triglycidyl ethers of trihydric alcohols such as glycerol, 1,1,1-tri(hydroxymethyl)propane, 1,2,6-hexanetriol and the higher alcohols; and the triglycidyl ethers of trihydric phenols, such as phloroglucinol, the trihydroxydiphenyl methanes and propanes, the trihydroxyaminophenols, the trisphenols; 2,2[2,4,4'-tris(epoxypropoxy)diphenyl]-propane; 1,1-bis(glycidyloxymethyl)-3,4-epoxycyclohexane; and N,N,O-tris(epoxypropyl) p-aminophenol.

Illustrative tetra- and higher polyglycidyl ethers that can be employed include tetraglycidyl ether of p,p'-diaminodiphenylmethane and epoxidized novolac compounds.

Cycloaliphatic polyepoxides which can be used to provide a protective size on carbon fibers in accordance with this invention include bis-2,3-epoxycyclopentyl ether; 1,4-bis(2,3-epoxypropoxy)-cyclohexane; 1,4-bis(3,4-epoxybutoxy)-2-chlorocyclohexane; the di(epoxycyclohexanecarboxylates) of aliphatic diols; the oxyalkylene glycol epoxycyclohexanecarboxylates; the epoxycyclohexylalkyl epoxycyclohexanecarboxylates; epoxycyclohexylalkyl dicarboxylates; epoxycyclohexylalkyl phenylenedicarboxylates; bis(3,4-epoxy-6-methylcyclohexylmethyl) diethylene glycol ether; dicyclopentadiene dioxide; bis(2,3-epoxycyclopentyl) ether; glycidyl 2,3-epoxycyclopentyl ether; 2,3-epoxycyclopentyl 2-methylglycidyl ether; cycloaliphatic triepoxides; also tetra- and higher homologues which contain more than three epoxy groups per molecule. Mixtures of the cycloaliphatic polyepoxides can also be employed.

Illustrative of the di(epoxycyclohexanecarboxylates) of aliphatic diols which can be employed include the bis(3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol.

Illustrative of the oxyalkylene glycol epoxycyclohexanecarboxylates which can be employed include bis(2-ethylhexyl-4,5-epoxycyclohexane-1,2-dicarboxylate) of dipropylene glycol, bis(3,4-epoxy-6-methylcyclohexanecarboxylate) of diethylene glycol and bis(3,4-epoxycyclohexanecarboxylate) of triethylene glycol.

Illustrative of the epoxycyclohexylalkyl epoxycyclohexanecarboxylates which can be employed include 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, 3,4-epoxy-2-methylcyclohexylmethyl 3,4-epoxy-2-methylcyclohexanecarboxylate, 3,4-epoxy-6-methylcyclohexylmethyl 3,4-epoxy-6-methylcyclohexanecarboxylate, (1-chloro-3,4-epoxycyclohexan-1-yl) methyl 1-chloro-3,4-epoxycyclohexanecarboxylate, (1-bromo-3,4-epoxycyclohexan-1-yl) methyl 1-bromo-3,4-epoxycyclohexanecarboxylate) and (1-chloro-2-methyl-4,5-epoxycyclohexan-1-yl) methyl 1-chloro-2-methyl-4,5-epoxycyclohexanecarboxylate.

Illustrative of the epoxycyclohexylalkyl dicarboxylates which can be employed include bis(3,4-epoxycyclohexylmethyl) pimelate and oxalate and bis(3,4-epoxy-6-methylcyclohexylmethyl) maleate, succinate, sebacate and adipate.

Illustrative of the epoxycyclohexylalkyl phenylenedicarboxylates which can be employed include bis(3,4-epoxycyclohexylmethyl) terephthalate and bis(3,4-epoxy-6-methylcyclohexylmethyl) terephthalate.

Illustrative cycloaliphatic triepoxides which can be employed include tris(3,4-epoxycyclohexanecarboxylate) of 1,1,1-trimethylol propane; and tris(3,4-epoxycyclohexanecarboxylate) of 1,2,3-propanetriol.

The sizing composition can be applied to the fiber in a suitable solvent to control the amount of size coated onto the fiber. However, the sizing composition can be applied directly, if desired. The concentration of the size in the solvent is usually in the range of from about 0.1 to about 10.0% by weight based on the total weight of the solution and is preferably from about 0.5 to about 2.0 percent. Examples of suitable solvents are polar solvents such as the halogenated hydrocarbons, for example, methylene chloride and ethylene dichloride; diacetone alcohol, ketones and esters. If desired, the sizing composition may also contain a lubricant. The lubricant serves to permit more even distribution of the size on the fiber and aids in more effective wetting of the fiber. Preferred lubricants are fatty acids, amides and esters. Other additives, such as coupling agents can also be added to the size solution.

The sizing compositions can be applied to the fibers by known methods, for example, by drawing the fibers through a bath containing the size or by spraying the size onto the fibers.

The drawing illustrates a preferred arrangement for sizing carbon fibers.

In the drawing, a carbon fiber strand 2 is drawn from supply reel 4 and passed into a tube 6. The arrows indicate the direction the carbon fiber strand 2 travels. The tube 6 is heated by hot air forced through the inlet tube 8 from a suitable source, such as an electric heat gun. The temperature of the hot air is sufficient to heat the tube to above the evaporation temperature of the solvent. The fiber is passed along the tube and down through an opening 9 in the bottom of the tube 6 and into the sizing bath 10. The fiber is directed down into the bath 10, through the bath and back through opening 9 into heated tube 6 by guide rollers 12, 14 and 16. The fiber is passed through the heated tube to evaporate the solvent and wound on a conventional take-up roll 18.

The amount of size coated onto the fiber is from about 0.4 to about 5.0%, by weight based on the weight of the fiber, preferably from about 0.9 to about 1.6 percent. The amount of size on the fiber is determined by weighing a given length of sized fiber, then dissolving the size from the fiber using a solvent for the size, drying the fiber and then reweighing the unsized fiber. From the difference in the weights the percentage of size on the fiber, based on the weight of the fiber, is calculated.

Carbon fibers sized with the epoxy compound sizing compositions of this invention can be used to prepare fiber reinforced composite structures. Any of the known methods for preparing such composites can be employed. For example, carbon fibers can be used to prepare filament wound composites. The epoxy sizing compositions of this invention protect the fibers from abrasion during the filament winding process. The sizing of the fiber also permits a smoother delivery of the carbon fiber during the filament winding. In another common method, the reinforced composite structure can be prepared by incorporating chopped sized carbon fibers into the matrix resin and then forming the composite structure, for example, by press molding. Since the sizing compositions of this invention are based on epoxide compounds, carbon fibers sized therewith are compatible with and do not interfere with adhesion between the carbon fibers and the epoxy resin-hardener systems used as the matrix resin of the composite. This is especially true when both the size composition and the matrix resin are both based on diglycidyl ethers of bisphenol A.

The following examples will illustrate the sizing of carbon fibers using the sizing compositions of this invention and the preparation of composites using said sized fibers. In the examples, parts and percentages are by weight unless otherwise specified.

EXAMPLES 1–9

Commercially available surface treated graphite fiber was sized with epoxy compounds in accordance with this invention in a suitable application process. The particular size and application solvent used in each example are shown in Table 1. In each case the fiber was sized by drawing the fiber through a heated tube and sizing bath as shown in the drawing. The fiber was pulled through the size solution at a rate of 2–4 feet per minute. The take-up was a typical Leesona take-up driver with a motor. The size produced on the fiber ranged from "soft to hard," as determined by the hand or feel of the resulting sized fiber. The term soft is used to describe a sized fiber which retains its limp hand and the term hard applies to a sized fiber having a stiff hand.

TABLE 1

| | | (Carbon Fiber Sizes) | | | |
|---|---|---|---|---|---|
| Example | Size | Solvent | Concentration (% Size in Solution) | % size Based on the Weight off the Fiber | Remarks |
| 1 | 76% Compound A<br>24% Compound B | Diacetone alcohol | 1.5 | 1.6 | Hard size |
| 2 | 76% Compound A<br>24% Compound B | " | 1.1 | 1.0 | " |
| 3 | 74.7% Compound A<br>23.6% Compound B<br>1.7% Compound C | " | 1.1 | 1.0 | " |
| 4 | 74.7% Compound A<br>23.6% Compound B<br>1.7% Compound C | " | 1.5 | 1.6 | " |
| 5 | 37.5% Compound A<br>62.5% Compound B | " | 1.0 | 1.0 | Medium soft size |
| 6 | 36.9% Compound A<br>61.4% Compound B<br>1.7% Compound C | " | 1.0 | 0.9 | " |
| 7 | Compound D | $CH_2Cl$ | 1.05 | 1.0 | Soft size |
| 8 | Mixture E | Ethylene dichloride | 1.0 | 1.4 | " |

TABLE 1-continued

| Example | Size | (Carbon Fiber Sizes) Solvent | Concentration (% Size in Solution) | % size Based on the Weight off the Fiber | Remarks |
| --- | --- | --- | --- | --- | --- |
| 9 | Compound B | " | 1.5 | 1.4 | " |

Compound A = diglycidyl ether of bisphenol A having a molecular weight of 380–1400.
Compound 3 = diglycidyl ether of bisphenol A having a molecular weight of 340–380.
Compound C = The amide of pelargonic acid.
Compound D = 2,6-diglycidyl phenyl glycidyl ether.
Mixture E = a mixture of 35% by wt. of bis-2,3-epoxycyclopentyl ether and 65% by wt. of the diglycidyl ether of bisphenol A; commercially available as ERLA 2256 from Union Carbide Corp.

EXAMPLE 10

The carbon fibers sized as described in Examples 1–9 were used to prepare composites employing each of the following epoxy matrix resin-hardener systems:

1. A matrix resin-hardener system comprising 100 parts by weight of 2,6-diglycidyl phenyl glycidyl ether (see footnote D of Table 1) and 20 parts by weight of a hardener comprising a eutectic mixture of metaphenylene diamine and methylene dianiline.[F]

[F] Eutectic mixture of metaphenylene diamine and methylene dianiline; commercially available as Tonox 6040 from Uniroyal, Inc.

2. A matrix resin-hardener system comprising 100 parts by weight of a mixture of 35% by weight of bis-2,3-epoxycyclopentyl ether and 65% by weight of the diglycidyl ether of bisphenol A (see footnote E of Table 1) and 29 parts by weight of a hardener comprising a eutectic mixture of metaphenylene diamine and methylene dianiline.

3. A matrix resin-hardener system comprising 100 parts by weight of N,N,N'-tris(epoxypropyl)-p,p'-diaminophenyl methane and 49 parts by weight of the hardener 4,4'-diaminodiphenyl sulfone.

The composite specimens were made in the form of an NOL ring containing about 60% by volume of sized carbon fiber. In preparation of the composite the carbon fiber is passed through the epoxy resin system, through a tensioning device and onto a rotating mold. The whole system is enclosed in a vacuum chamber to provide a low void composite specimen. The mold is removed from the NOL winding device and placed in a curing oven to cure the resin. The time and temperature of curing each of the resin matrix-hardener systems is shown in Table 1. A discussion of NOL ring specimens and their manufacture may be found in *Plastics Technology*, November 1958, pp. 1017–1024, and Proceedings of 21st Annual Technical Conference SPI Reinforced Plastics Division, Section 8-D, February 1966.

Composite samples prepared as described were tested for interlaminar shear strength in accordance with ASTM-D 2344 (a) without further treatment and (b) after the samples were boiled in water for 72 hours. The results, shown in Table 2, show that the size composition does not detract from the adhesion between the carbon fibers and the resin matrix.

Table 2

NOL Ring Composites: Interlaminar Shear Strength Using Sized Carbon Fibers

| Resin Matrix-Hardener System | Curing Conditions | Sized Fiber | % Size on Fiber, Based on Wt. of the Fiber | Interlaminar Shear Strength (p.s.i.) Dry | Wet* |
| --- | --- | --- | --- | --- | --- |
| 1 | 16 hours at 110°C. followed by 4 hours at 145°C. | Unsized | — | 12,500 | |
| | | Ex. 1 | 1.6 | 14,000 | 11,600 |
| | | Ex. 2 | 1.0 | 13,600 | |
| | | Ex. 3 | 1.0 | 13,400 | |
| | | Ex. 4 | 1.6 | 14,000 | |
| | | Ex. 5 | 1.0 | 13,400 | 10,800 |
| | | Ex. 6 | 0.9 | 13,400 | |
| | | Ex. 7 | 1.0 | 12,000 | |
| 2 | 1 hour at 125°C. followed by 4 hours at 175°C. | Unsized | — | 14,000 | |
| | | Ex. 1 | 1.6 | 14,100 | 12,100 |
| | | Ex. 2 | 1.0 | 13,000 | |
| | | Ex. 3 | 1.0 | 13,900 | |
| | | Ex. 4 | 1.6 | 12,800 | |
| | | Ex. 5 | 1.0 | 12,100 | 11,100 |
| | | Ex. 6 | 0.9 | 11,900 | |
| | | Ex. 8 | 1.4 | 13,100 | |
| 3 | 2 hours at 125°C. followed by 4 hours at 160°C. | Unsized | — | 12,700 | |
| | | Ex. 9 | 1.4 | 12,600 | |

*After 72 hour boil in distilled water.

EXAMPLE 11

Carbon fibers sized with soft, medium soft, and hard sizes as described in Example 1–9 were tested for abrasion resistance. A typical filament winding delivery system was set up to assess the effect on size on the abrasion resistance of carbon fiber during filament winding. The system consisted of a CTC Tensioner, commercially available from Compensating Tension Controls, Inc., set at 3 pounds tension. The fiber was taken over an aluminum wheel, a carbon wheel, and onto a 2.6 inch diameter mandrel on a filament winding machine. The degree of abrasion was measured by percent retention of original carbon fiber tensile strength. The results, shown in Table 3, show the improvement in abrasion resistance of carbon fibers when sized with the epoxy size compositions.

Table 3

Abrasion Resistance of Sized and Unsized Carbon Fibers

| Type of Size | Tensile Strength Retention after delivery system, handling, % |
| --- | --- |
| Unsized | 75 |
| Soft Size (Example 8, Table 1) | 85 |
| Medium Soft Size (Example 5, Table 1) | 100 |
| Hard Size (Example 2, Table 1) | 98 |

The preferred sizing compositions of this invention are selected from the group consisting of (a) a liquid diglycidyl ether of bisphenol A having a molecular weight of about 340 to about 380; (b) a mixture of a solid diglycidyl ether of bisphenol A having a molecular weight of about 380 to 1400 and a liquid diglycidyl ether of bisphenol A having a molecular weight of about 340 to about 380; (c) a mixture of bis-2,3-epoxycyclopentyl ether and the diglycidyl ether of bisphenol A; and (d) 2,6-diglycidyl phenyl glycidyl ether.

The application of the different sizing compositions produce a different feel or hand on the fiber ranging from soft to hard. For example, a soft size is obtained when the fiber is treated with 2,6-diglycidyl phenyl glycidyl ether, the diglycidyl ether of bisphenol A having a molecular weight in the range of 340 to about 380 or a eutectic mixture of 35% by weight of bis-2,3-epoxycyclopentyl ether and 65% by weight of the diglycidyl ether of bisphenol A. A hard size is obtained when the fiber is treated with a mixture of about 50 to about 80% by weight, preferably 76% by weight of the solid diglycidyl ether of bisphenol A having a molecular weight of about 380 to about 1400 and from about 20 to about 50% by weight, preferably 24% by weight of the liquid diglycidyl ether bisphenol A having a molecular weight in the range of about 340 to about 380. A medium soft size is obtained when the carbon fiber is treated with a mixture of about 20 to about 50% by weight, preferably 37.5% by weight of the solid diglycidyl ether of bisphenol A having a molecular weight of about 380 to 1400 and about 50 to about 80% by weight, preferably 62.5% by weight of the liquid diglycidyl ether of bisphenol A having a molecular weight in the range of about 340 to 380.

What I claim and desire to protect by Letters Patent is:

1. A composite structure comprising a cured epoxy resin matrix containing carbon fibers having coated on the surface thereof from about 0.4 to about 5.0% by weight, based on the weight of the fiber, of a sizing composition selected from the group consisting of polyglycidyl ethers, cycloaliphatic polyepoxides and mixtures thereof.

2. A composite structure as set forth in claim 1 wherein the sizing composition is selected from the group consisting of:
   a. a liquid diglycidyl ether of bisphenol A;
   b. 2,6-diglycidyl phenyl glycidyl ether;
   c. a mixture of a solid diglycidyl ether of bisphenol A and a liquid diglycidyl ether of bisphenol A; and
   d. a mixture of bis-2,3-epoxycyclopentyl ether and the diglycidyl ether of bisphenol A.

3. A composite structure as set forth in claim 1 wherein the sizing composition comprises a mixture of about 50 to about 80% by weight of a solid diglycidyl ether of bisphenol A having a molecular weight of about 380 to about 1400 and about 20 to about 50% by weight of a liquid diglycidyl ether of bisphenol A having a molecular weight of about 340 to about 380.

4. A composite structure as set forth in claim 1 wherein the sizing composition comprises a mixture of about 20 to about 50% by weight of a solid diglycidyl ether of bisphenol A having a molecular weight of about 380 to about 1400 and about 50 to about 80% by weight of a liquid diglycidyl ether of bisphenol A having a molecular weight of about 340 to about 380.

* * * * *